(12) United States Patent
Xia

(10) Patent No.: US 10,935,844 B2
(45) Date of Patent: Mar. 2, 2021

(54) LIGHT SOURCE, BACKLIGHT MODULE, DISPLAY DEVICE, AND ELECTRONIC DEVICE

(71) Applicants: HEFEI BOE DISPLAY LIGHTING CO., LTD., Anhui (CN); BOE TECHNOLOGY GROUP CO., LTD., Beijing (CN)

(72) Inventor: Xiaoli Xia, Beijing (CN)

(73) Assignees: Hefei BOE Display Lighting Co., Ltd., Anhui (CN); BOE Technoloev Group Co., Ltd., Beijing (CN)

( * ) Notice: Subject to any disclaimer, the term of this patent is extended or adjusted under 35 U.S.C. 154(b) by 0 days.

(21) Appl. No.: 16/618,586

(22) PCT Filed: May 28, 2019

(86) PCT No.: PCT/CN2019/088746
§ 371 (c)(1),
(2) Date: Dec. 2, 2019

(87) PCT Pub. No.: WO2019/228327
PCT Pub. Date: Dec. 5, 2019

(65) Prior Publication Data
US 2020/0292879 A1 Sep. 17, 2020

(30) Foreign Application Priority Data
May 28, 2018 (CN) .......................... 2018 1 0524860

(51) Int. Cl.
*F21V 21/00* (2006.01)
*G02F 1/13357* (2006.01)
*F21V 8/00* (2006.01)
(52) U.S. Cl.
CPC ..... *G02F 1/133605* (2013.01); *G02B 6/0028* (2013.01); *G02F 1/133606* (2013.01)

(58) Field of Classification Search
CPC ......... G02F 1/133605; G02F 1/133606; G02B 6/0028; G02B 6/0075; G02B 6/0078; G02B 6/009; G02B 6/0091
(Continued)

(56) References Cited

U.S. PATENT DOCUMENTS 7,121,708 B2 * 10/2006 Tsai ........................ G09F 13/04
362/605
7,600,890 B2 * 10/2009 Swantner ................ F21V 29/74
250/239

(Continued)

FOREIGN PATENT DOCUMENTS

CN 101329472 A 12/2008
CN 101852375 A 10/2010
(Continued)

OTHER PUBLICATIONS

First Office Action for CN Appl. No. 201810524860.3, dated Feb. 25, 2020.

*Primary Examiner* — Laura K Tso
(74) *Attorney, Agent, or Firm* — The Webb Law Firm

(57) ABSTRACT

The present disclosure provides a light source. The light source of the present disclosure comprises a substrate and a light emitting portion. The light emitting portion comprises a first light emitting component, a second light emitting component, and a separation component. The first light emitting component is provided on the substrate. The second light emitting component is disposed on the substrate and can emit light independently from the first light emitting component. The separation component is located between the first light emitting component and the second light emitting component and is a light reflective structure, such that the first light emitting component and the second light emitting component emit light toward directions away from the reflective structure respectively. The present disclosure (Continued)

also provides a backlight module including the light source and a light guide plate, a display device including the backlight module, and an electronic device including the display device.

8 Claims, 3 Drawing Sheets

(58) Field of Classification Search
USPC ....... 362/97.1, 616, 611, 612, 613, 602, 609
See application file for complete search history.

(56) References Cited

U.S. PATENT DOCUMENTS

| | | | | |
|---|---|---|---|---|
| 7,641,360 | B2* | 1/2010 | Chou | G02F 1/133605 |
| | | | | 362/235 |
| 9,841,627 | B2* | 12/2017 | Fan | H01L 33/405 |
| 2010/0225572 | A1* | 9/2010 | Suminoe | G02B 6/0035 |
| | | | | 345/102 |
| 2012/0008308 | A1* | 1/2012 | Adachi | G02B 6/0021 |
| | | | | 362/97.2 |
| 2012/0321290 | A1* | 12/2012 | Daijo | G02B 6/0018 |
| | | | | 396/200 |
| 2014/0307473 | A1* | 10/2014 | Chen | G06F 3/1446 |
| | | | | 362/613 |
| 2016/0004006 | A1* | 1/2016 | Zhu | G02B 6/009 |
| | | | | 362/613 |
| 2017/0254949 | A1 | 9/2017 | Fan | |

FOREIGN PATENT DOCUMENTS

| | | |
|---|---|---|
| CN | 201945776 U | 8/2011 |
| CN | 103775963 A | 5/2014 |
| CN | 105090820 A | 11/2015 |
| CN | 105116610 A | 12/2015 |
| CN | 105158969 A | 12/2015 |
| CN | 106647030 A | 5/2017 |
| CN | 108761910 A | 11/2018 |

* cited by examiner

LIGHT SOURCE, BACKLIGHT MODULE, DISPLAY DEVICE, AND ELECTRONIC DEVICE

CROSS-REFERENCE TO RELATED APPLICATIONS

The present application is a U.S. National Stage under 35 U.S.C. § 371 of International Application No. PCT/CN2019/088746, as filed on May 28, 2019, which claims priority to Chinese Patent Application No. 201810524860.3, as filed on May 28, 2018. The contents disclosed in each of these applications are incorporated herein by reference in its entirety.

TECHNICAL FIELD

The present disclosure relates to a light source, backlight module, display device, and electronic device.

BACKGROUND

With the development of display technology, display devices have been widely used in various fields, and applications of liquid crystal display devices are relatively common. For a liquid crystal display device, a backlight module is an indispensable component thereof. Light emitted by the backlight module is modulated by the liquid crystal panel to display an image. At present, the backlight module generally includes a light guide plate and a light source. The light source is located below or on a side of the light guide plate, and is used to emit light to the light guide plate, so that the light uniformly exits from the light guide plate.

It should be noted that the information disclosed in above background is merely for the enhancement of understanding of the background of the present disclosure and therefore may include information that does not form the prior art that has already known to one of ordinary skill in the art.

SUMMARY

According to one or more aspects of the present disclosure, a light source of a backlight module includes a substrate and a light emitting portion disposed on the substrate;

the light emitting portion includes:

a first light emitting component disposed on the substrate;

a second light emitting component disposed on the substrate and capable of emitting light independently of the first light emitting component;

a separation component located between the first light emitting component and the second light emitting component, the separation component being a light reflective structure, such that the first light emitting component and the second light emitting component emit light toward directions away from the reflective structure respectively.

In an exemplary embodiment of the present disclosure, the light emitting portion has an annular shape, and the first light emitting component, the second light emitting component, and the separation component all have annular shapes. The separation component surrounds the second light emitting component, and the first light emitting component surrounds the separation component such that the first light emitting component emits light toward an outer side of the annular shape thereof, and the second light emitting component emits light toward an inner side of the annular shape thereof.

In an exemplary embodiment of the present disclosure, the light emitting portion has a linear shape, and the first light emitting component, the second light emitting component, and the separation component all have linear shapes. The first light emitting component and the second light emitting component are located on opposite sides of the separation component such that the first light emitting component emits light toward one side of the light emitting portion, and the second light emitting component emits light toward the other side of the light emitting portion.

In an exemplary embodiment of the present disclosure, the first light emitting component includes:

a plurality of first light emitting units disposed on the substrate;

the second light emitting component comprises:

a plurality of second light emitting units disposed on the substrate.

In an exemplary embodiment of the present disclosure, the first light emitting component further includes:

a first scattering layer covering each of the first light emitting units;

the second light emitting component further comprises:

a second scattering layer covering each of the second light emitting units.

In an exemplary embodiment of the present disclosure, the light source further includes:

a reflective component matched to the shape of the light emitting portion and covering the light emitting portion from a side opposite to the substrate.

According to an aspect of the present disclosure, a backlight module is provided, including:

a light guide plate having a backlight side and a light exiting side;

a light source according to any one of the above, wherein the light emitting portion of the light source extends into the light guide plate from the backlight side to separate the light guide plate into a first light emitting region and a second light emitting region, the light emitting component being configured to emit light to the first light emitting region, and the second light emitting component being configured to emit light to the second light emitting region.

In an exemplary embodiment of the present disclosure, the backlight side is provided with a receiving groove recessed toward the light exiting side, the light emitting portion extending into the receiving groove.

In an exemplary embodiment of the present disclosure, the light guide plate includes a first plate body and a second plate body that are independent of each other, wherein a receiving gap is formed between the first plate body and the second plate body, the light emitting portion extending into the receiving gap.

According to an aspect of the present disclosure, there is provided a display device comprising a backlight module of any of the above items.

According to an aspect of the present disclosure, an electronic device comprising a display device according to any one of the above items is provided.

It should be understood that both the foregoing general description and the following detailed description are only exemplary and explanatory and are not restrictive of the disclosure.

BRIEF DESCRIPTION OF THE DRAWINGS

Herein, the accompanying drawings, which are incorporated in and constitute a part of this specification, illustrate embodiments of the present disclosure and, together with the description, serve to explain the principles of the present disclosure. It is obvious that, the drawings illustrated as follows are merely some of the embodiments of the present invention. For a person skilled in the art, he or she may also acquire other drawings according to such drawings on the premise that no inventive effort is involved.

DETAILED DESCRIPTION

Figure 1:
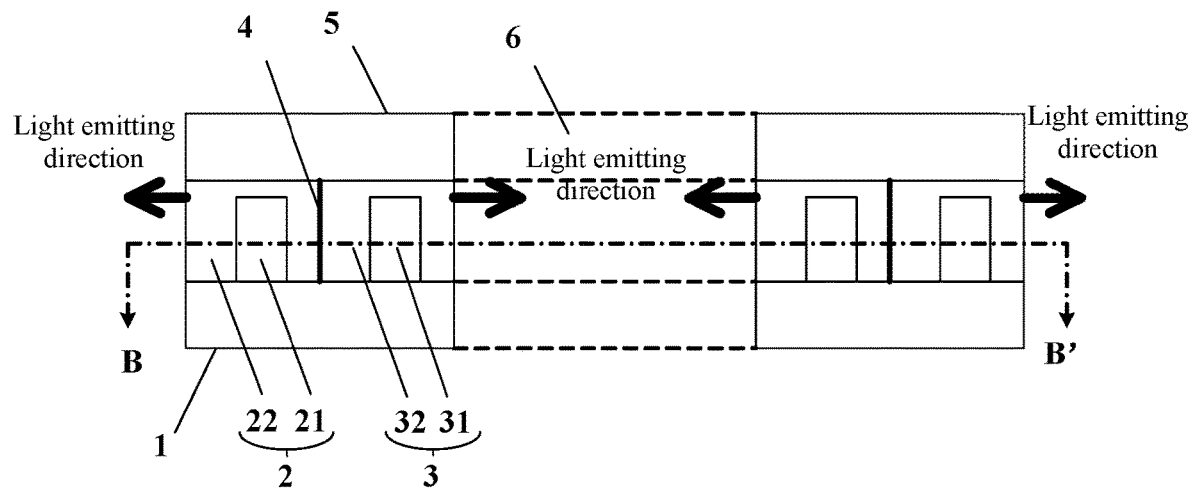
FIG. 1 is a schematic diagram of an embodiment of a light source of the present disclosure.

Example embodiments will now be fully described with reference to the accompanying drawings. However, the exemplary embodiments may be implemented in many different forms and should not be construed as limited to the embodiments set forth herein. Rather, these embodiments are provided by way of example so that this disclosure will be thorough and complete, and will fully convey the concept of the exemplary embodiments to those skilled in the art. Like reference numerals in the drawings denote the same or like elements, and thus their detailed description will be omitted.

Although relative terms such as "upper" and "lower" are used in the specification to describe the relative relationship of one illustrated component to another component, these terms are used in this specification for convenience only, for example, a direction described in an example according to the accompanying drawings. It will be understood that if the illustrated device is flipped upside down, the described "upper" component will become a "lower" component. If one structure is "on" another structure, it may mean that such structure is integrally formed on another structure, or that such structure is "directly" disposed on another structure, or that such structure is "indirectly" disposed on another structure via other structures.

The terms "a", "an", "the", "said" are used to indicate the presence of one or more elements/components, etc. The terms "comprising" and "having" are used to indicate an inclusive meaning and indicate that there are additional elements/components and so on in addition to the listed elements/components. The terms "first" and "second" are used only as tags, but are not used to limit the number of objects.

Figure 2:
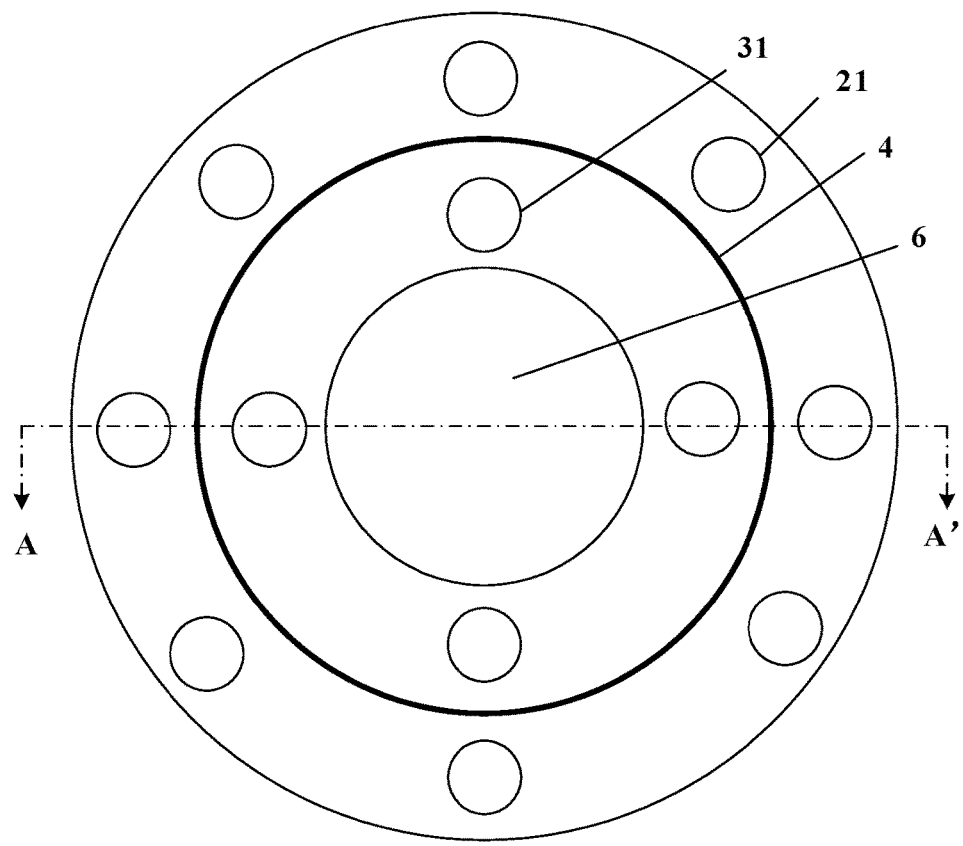
FIG. 2 is a cross-sectional view taken along line B-B' in FIG. 1.

Embodiments of the present disclosure provide a light source of a backlight module that can be used as a backlight module of a display device. FIGS. 1 and 2 are schematic diagrams of an embodiment of the light source of the present disclosure. FIG. 2 is a cross section taken along line B-B' in FIG. 1, and FIG. 1 is a cross section taken along line A-A' in FIG. 2.

As shown in FIG. 1, the light source of the embodiment of the present disclosure can include a substrate 1 and a light emitting portion 10 disposed on the substrate 1. The light emitting portion 10 can include a first light emitting component 2, a second light emitting component 3, and a separation component 4, wherein:

the first light emitting component 2 can be disposed on the substrate 1.

The second light emitting component 3 can be disposed on the substrate 1 and can emit light independently from the first light emitting component 2.

The separation component 4 can be located between the first light emitting component 2 and the second light emitting component 3. The separation component 4 is a light reflective structure, such that the first light emitting component and the second light emitting component emit light toward a direction away from the reflective structure, respectively.

In the light source of the backlight module of the embodiment of the present disclosure, the first light emitting component 2 and the second light emitting component 3 can emit light independently, that is, they can emit light simultaneously or only one of them emits light. Meanwhile, the separation component 4 can space the first light emitting component 2 apart from the second light emitting component 3, and can reflect light such that the first light emitting component and the second light emitting component emit light respectively in a direction away from the light reflective structure, thereby preventing the light emitted by the first light emitting component 2 and the light emitted by the second light emitting component 3 from affecting each other. In this way, two independent light emitting regions can be formed, the first light emitting component 2 providing light for one of these regions, and the second light emitting component 3 providing light for the other, without affecting each other. When only one of the first light emitting component 2 and the second light emitting component 3 is required to emit light, the other can be turned off to reduce power consumption. When the first light emitting component 2 and the second light emitting component 3 are required to simultaneously emit light, the first light emitting component 2 and the second light emitting component 3 can operate simultaneously.

The components of the light source of the embodiment of the present disclosure will be described in detail below.

As shown in FIG. 1 and FIG. 2, the substrate 1 can be a flat plate structure, and can have a circular, square, or ring shape. The size of the substrate 1 is not particularly limited as long as the light emitting portion 10 can be mounted. A first circuit and a second circuit can be disposed on the substrate 1. The first circuit can be used to control the first light emitting component 2, and the second circuit can be used to control the second light emitting component 3 without affecting each other, such that the first light emitting component 2 and the second light emitting component 3 can be controlled to emit light independently.

As shown in FIGS. 1 and 2, the light emitting portion 10 can be disposed on the substrate 1. The light emitting portion 10 can have an annular shape, for example, a circle-ring shape, a square-ring shape, or the like, and has an opening 6 at the center of the annular shape. Of course, the light emitting portion 10 can also have a linear, curved, or other shape.

As shown in FIGS. 1 and 2, the first light emitting component 2 can be disposed on the substrate 1 and can emit light. The first light emitting component 2 can have an annular shape, such as a circle-ring shape, a square-ring shape, or the like. Of course, the first light emitting component 2 can also have a linear, curved or other shape. For example, the first light emitting component 2 can include a first light emitting unit 21 and a first scattering layer 22, wherein:

the first light emitting unit 21 can be an LED light emitting chip or other chip or device capable of emitting light. There can be a plurality of first light emitting units 21 fixed on the substrate 1 and distributed in an annular shape, each of the first light emitting units 21 being connected to the first circuit. Further, each of the first light emitting units 21 can be disposed in series to control the respective first light emitting units 21 to simultaneously emit light. Alternatively, the first light emitting units 21 can be arranged in parallel to be independently controlled. It should be understood that the first circuit can also be a hybrid circuit such that, among the first light emitting units 21, there are first light emitting units 21 connected in series with each other, and first light emitting units 21 connected in parallel.

The first scattering layer 22 can cover the first light emitting units 21 to make the light emitted by the first light emitting units 21 more uniform. The material of the first scattering layer 22 can be a transparent fluorescent material or other material that can make the light uniform.

Of course, the first light emitting component 2 can also have other structures, as long as light can be emitted independently, which will not be enumerated here.

As shown in FIGS. 1 and 2, the second light emitting component 3 can also be disposed on the substrate 1 and can emit light. The second light emitting component 3 can have an annular shape, such as a circle-ring shape, a square-ring shape, or the like. Of course, the second light emitting component 3 can also have a linear, curved or other shape. If the second light emitting component 3 has an annular shape, it can be disposed inside the first light emitting component 2 such that the first light emitting component 2 embraces the second light emitting component 3.

For example, the second light emitting component 3 can include a second light emitting unit 31 and a second scattering layer 32.

The second light emitting unit 31 can be an LED light emitting chip or other chip or device capable of emitting light. There can be a plurality of second light emitting units 31 fixed on the same surface of the substrate 1 as the first light emitting units 21. The plurality of second light emitting units 31 are distributed in an annular shape, and in the case where the first light emitting units 21 are annularly distributed, the plurality of second light emitting units 31 are located in a region surrounded by the first light emitting units 21. Moreover, each of the second light emitting units 31 can be connected to the second circuit to form series, parallel or hybrid connection of the second light emitting units 31, so as to control the respective second light emitting units 31.

The second scattering layer 32 can cover each of the second light emitting units 31, and the material thereof can be the same as that of the first scattering layer 22 to make the light emitted by the second light emitting units 31 more uniform. Further, the second scattering layer 32 and the first scattering layer 22 can be two independent layers provided in the same layer that are not connected to each other. Alternatively, the second scattering layer 32 and the first scattering layer 22 can also be the same film layer, which can cover each of the first light emitting units 21 and the second light emitting units 31 at the same time.

Of course, the second light emitting component 3 can also have other structures, as long as light can be emitted independently, which will not be enumerated here.

It should be noted that, for the substrate 1 having a small size, if the space on the substrate 1 is difficult to accommodate all the first light emitting units 21 and the second light emitting units 31, a circuit board can be added to the substrate 1, and some of the first light emitting units 21 and the second light emitting units 31 can be disposed on the circuit board, as long as it can be ensured that each of the first light emitting units 21 is connected to the first circuit, each of the second light emitting units 31 can be connected to the second circuit.

As shown in FIG. 1 and FIG. 2, the separation component 4 can be disposed between the first light emitting component 2 and the second light emitting component 3 to space the first light emitting component 2 apart from the second light emitting component 3. The separation component 4 is a reflective structure, such that two light emitting regions can be formed. The light in the first region is provided only by the first light emitting component 2, and the light in the second region is only provided by the second light emitting component 3, such that the first light emitting component 2 and the second light emitting component 3 emit light in a direction away from the reflective structure 4 respectively. As shown in FIG. 1, in the case where the light emitting portion 10 has an annular shape, the light exiting direction of the light emitted by the first light emitting component 2 faces the outer side of the annular structure, and the light exiting direction of the light emitted by the second light emitting component 3 faces the inner side of the annular structure, i.e., toward the opening 6 at the center of the annular structure. The separation component 4 can be a reflective sheet formed between the first light emitting component 2 and the second light emitting component 3 or a sheet-like structure coated with a reflective coating, etc, as long as it has a reflective effect. The separation component 4 can have an annular shape, such as a circle-ring shape, a square-ring shape, or the like. The separation component 4 can also have a linear, curved or other shape as long as it can block the reflected light.

As shown in FIGS. 1 and 2, the light source of the present disclosure can further include a light reflecting component 5 having a shape that matches the shape of the light emitting portion 10 and covering the light emitting portion 10 from a side opposite to the substrate. For example, the light emitting portion 10 has an annular shape, the light reflecting component 5 also has an annular shape, and the light reflecting component 5 covers the light emitting portion 10, so that the region surrounded by the light emitting portion 10 is not covered by the light reflecting component 5.

The light reflecting component 5 can be a light reflective sheet of a reflective material located on the upper side of the light emitting portion 10, or can be a reflective film layer covering the light emitting portion 10 from the upper side as long as it can reflect light. Thereby, the light emitted by the first light emitting component 2 and the second light emitting component 3 can be reflected by the light reflecting component 5, and in cooperation with the light reflective separation component 4, light can be guided to propagate to the two regions separated by the separation component 4. Of course, the light source of the present disclosure cannot include the light reflecting component 5.

The light source of the present disclosure can include a substrate 1, a light emitting portion 10, and a light reflecting component 5. The light emitting portion 10 can be disposed on the substrate 1, and can include a first light emitting component 2, the second light emitting component 3, and a separation component 4. The light emitting portion 10 can have an annular shape, that is, the first light emitting component 2, the second light emitting component 3, and the separation component 4 all have annular shapes, and the light reflecting component 5 also has an annular shape.

The first light emitting component 2 can include a first light emitting unit 21 and a first scattering layer 22. There are a plurality of first light emitting units 21 fixed on the substrate 1 and distributed in an annular shape. Further, each of the first light emitting units 21 is connected to the first circuit on the substrate 1. The first scattering layer 22 can be a transparent fluorescent material that can cover the first light emitting units 21.

The second light emitting unit 3 can include a second light emitting unit 31 and a second scattering layer 32. There can be a plurality of second light emitting units 31 that are fixed on the substrate 1 and distributed in an annular shape in a region surrounded by the first light emitting units 21. Further, each of the second light emitting units 31 is connected to the second circuit on the substrate 1. The second scattering layer 32 can cover the second light emitting units 31.

The separation component 4 can be disposed on the substrate 1 and surround the second light emitting component 3. The first light emitting component 2 can surround the separation component 4. The first light component 2 is spaced apart from the second light component 3 by the separation component 4, so that the first light emitting component 2 emits light toward the outer side of the annular structure, the second light emitting component 3 emits light toward the inner side of the annular structure, i.e., toward the opening 6 at the center of the annular structure, and the light emitted by the first light emitting component 2 and the light emitted by the second light emitting component 3 do not affect each other.

The light reflecting component 5 can cover the light emitting portion 10 from a side opposite to the substrate, that is, it can simultaneously cover the first light emitting component 2, the second light emitting component 3, and the separation component 4 from the upper side. The light reflecting component 5 can reflect the light emitted by the first light emitting component 2 and the second light emitting component 3, so that the light can only exit from the side of the light source, that is, from the regions separated by the separation component 4.

In other embodiments of the light source of the present disclosure, the light emitting portion 10 of the light source can also be linear, so as to form two side-by-side light emitting regions for emitting light independently. Of course, other shapes of the light emitting portion 10 can also be used, which will not be enumerated here.

Figure 3:
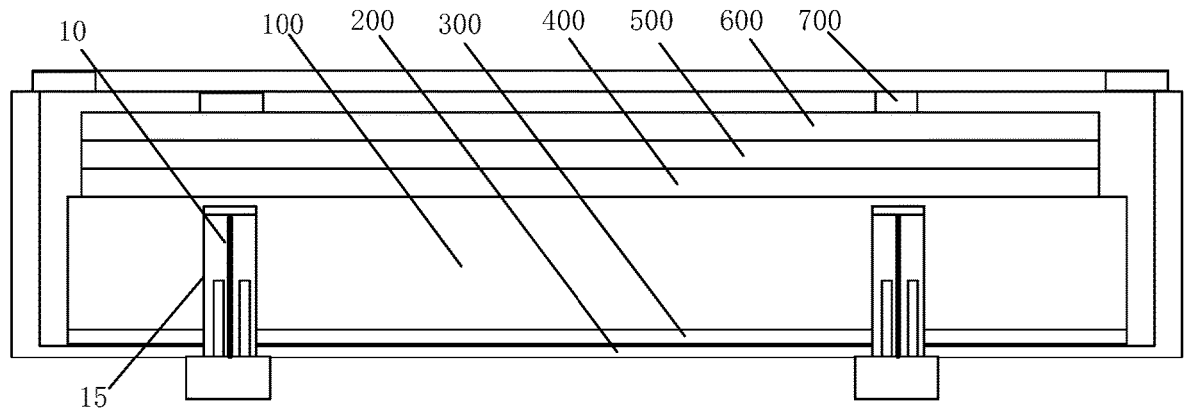
FIG. 3 is a schematic diagram of an embodiment of a backlight module of the present disclosure.
Figure 4:
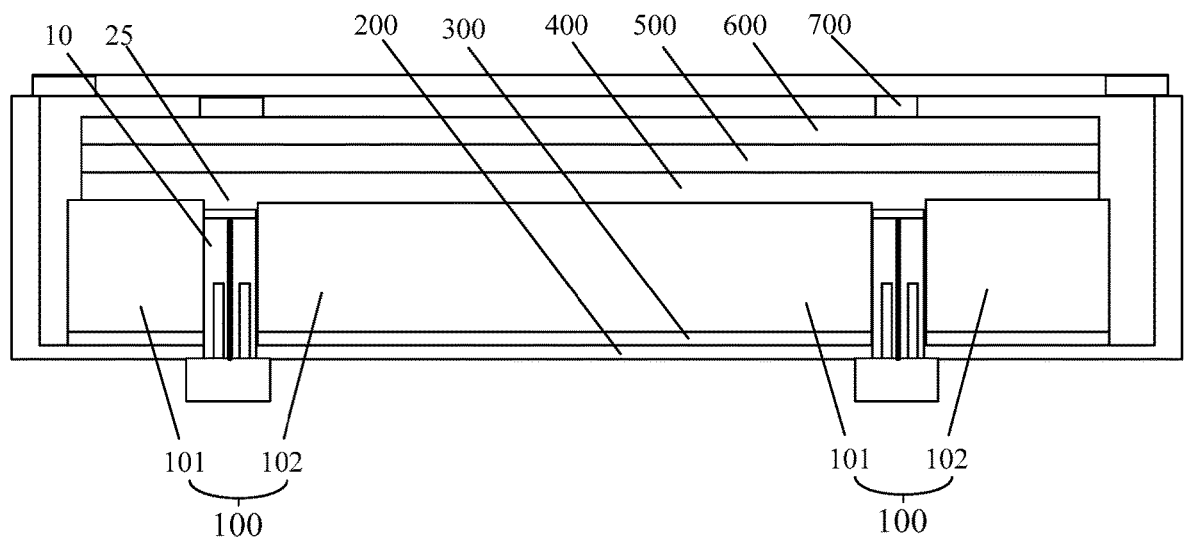
FIG. 4 is a schematic diagram of another embodiment of the backlight module of the present disclosure.

As shown in FIG. 3 and FIG. 4, an embodiment of the present disclosure provides a backlight module including a light guide plate 100 and the light source of any one of the above embodiments, wherein:

the light guide plate 100 has a backlight side and a light exiting side.

The light emitting portion 10 of the light source can extend into the light guide plate 100 from the backlight side to divide the light guide plate 100 into a first light emitting region and a second light emitting region. The light emitted by the first light emitting component 2 can extend into the first light emitting region, and the light emitted by the second light emitting component 3 can extend into the second light emitting region, so that the light guide plate 100 have two independent light emitting regions that do not affect each other, to realize partitioned display and reduce energy consumption.

The manner in which the light source extends into the light guide plate 100 will be exemplified below.

As shown in FIG. 3, in a first embodiment of the backlight module, the backlight side of the light guide plate 100 can be provided with a receiving groove 15 recessed toward the light exiting side, and the light emitting portion 10 can extend into the receiving groove 15.

For example, the light emitting portion 10 has an annular shape. Moreover, the first light emitting component 2, the second light emitting component 3, and the separation component 4 all have annular shapes, and the light reflecting component 5 also has annular shape and covers the first light emitting component 2, the second light emitting component 3, and the separation component 4 from the upper side. The receiving groove 15 of the first light guide plate 100 also has an annular shape. The light emitting portion 10 can extend into the receiving groove 15, and the portion of the light guide plate 100 located outside the receiving groove 15 is surrounded by the first light emitting component 2. The first light emitting component 2 can emit light in this portion to form a first light emitting region. A portion of the light guide plate 100 located in the region enclosed by the receiving groove 15 is surrounded by the second light emitting component 3, and the second light emitting component 3 can emit light in this portion to form a second light emitting region. Further, the substrate 1 can be located outside the backlight side of the light guide plate 100.

As shown in FIG. 4, in another embodiment of the backlight module, the light guide plate 100 can include a first plate body 101 and a second plate body 102 that are independent of each other, wherein a receiving gap 25 is formed between the first plate body 101 and the second plate body 102, and the light emitting portion 10 can extend into the receiving gap 25.

For example, the light emitting portion 10 has an annular shape, and the first light emitting component 2, the second light emitting component 3, the separation component 4, and the light reflecting component 5 all have annular shapes. In addition, the first plate body 101 has an annular shape, and the second plate body 102 has a circular shape and is disposed inside the first place body 101. An annular receiving gap 25 is formed between the first plate body 101 and the second plate body 102. The light emitting portion 10 can extend into the receiving gap 25 such that the first light emitting component 2 surrounds the first plate body 101 and the second light emitting component 3 surrounds the second plate body 102. The first light emitting component 2 can emit light to the first plate body 101, such that the first plate body 101 can serve as a first light emitting region. The second light emitting component 3 can emit light to the second plate body 102, such that the second plate body 102 can serve as a second light emitting region. Further, the substrate 1 can be located outside the backlight side of the light guide plate 100.

In addition, as shown in FIG. 3 and FIG. 4, the backlight module of the present disclosure can further include a back plate 200. The back plate 200 can be disposed on the backlight side of the light guide plate 100, and a reflective layer 300 is disposed between the back plate 200 and the light guide plate 100. The light source can extend into the light guide plate 100 through the back plate 200 and the reflective layer 300, and the substrate 1 is attached to the surface of the back plate 200 away from the light guide plate 100. Further, the light exiting side of the light guide plate 100 is provided with a diffusion layer 400. The diffusion layer 400 is provided with a first prism sheet 500 and a second prism sheet 600 is provided on the first prism sheet 500. The second prism sheet 600 is provided with light-shielding strips 700. Of course, the backlight module can further include a frame or the like, which will not be described in detail herein.

An embodiment of the present disclosure provides a display device that can include the backlight module described above. Partitioned display can be implemented to reduce energy consumption. Of course, the display device can further include a liquid crystal panel facing the backlight module and other components, which will not be described in detail herein.

An embodiment of the present disclosure further provides an electronic device, which can include the display device described above, and can implement partitioned display to reduce energy consumption.

For example, the electronic device is an electronic watch, and the electronic device can include a display device, watch hands, and a driving device. The backlight module of the display device can be a backlight module according to any one of the above embodiments. Referring to the above described backlight module, a through hole can be provided at the center of the light guide plate 100, and the second light emitting component 3 surrounds the through hole. The watch hands can be disposed on the light emitting side of the display device. The driving device can be disposed on the backlight side of the display device, and can be connected to the watch hands through a transmission mechanism passing through the through hole to drive the watch hands to rotate.

Figure 5:
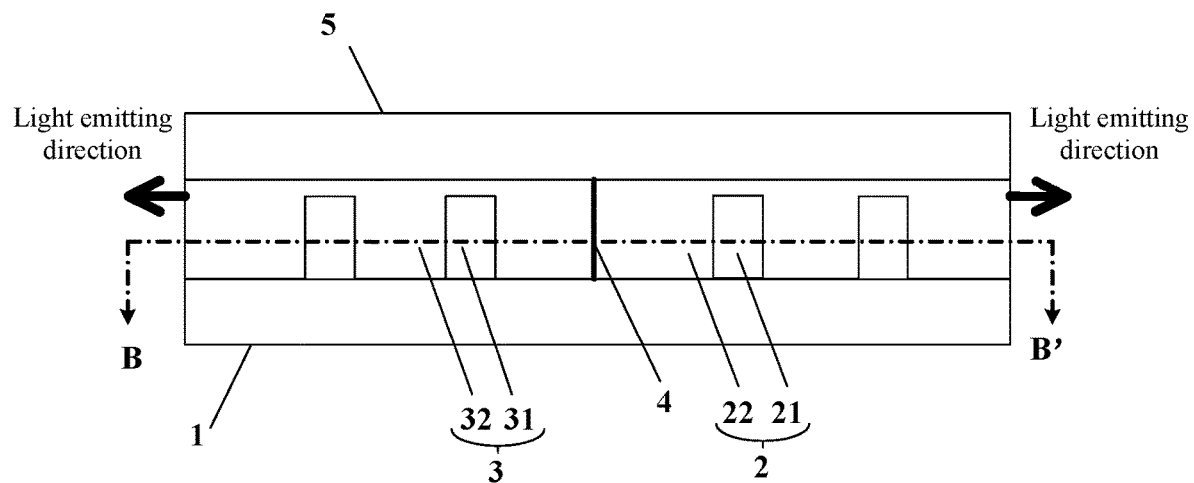
FIG. 5 is a schematic diagram of another embodiment of the light source of the present disclosure.
Figure 6:
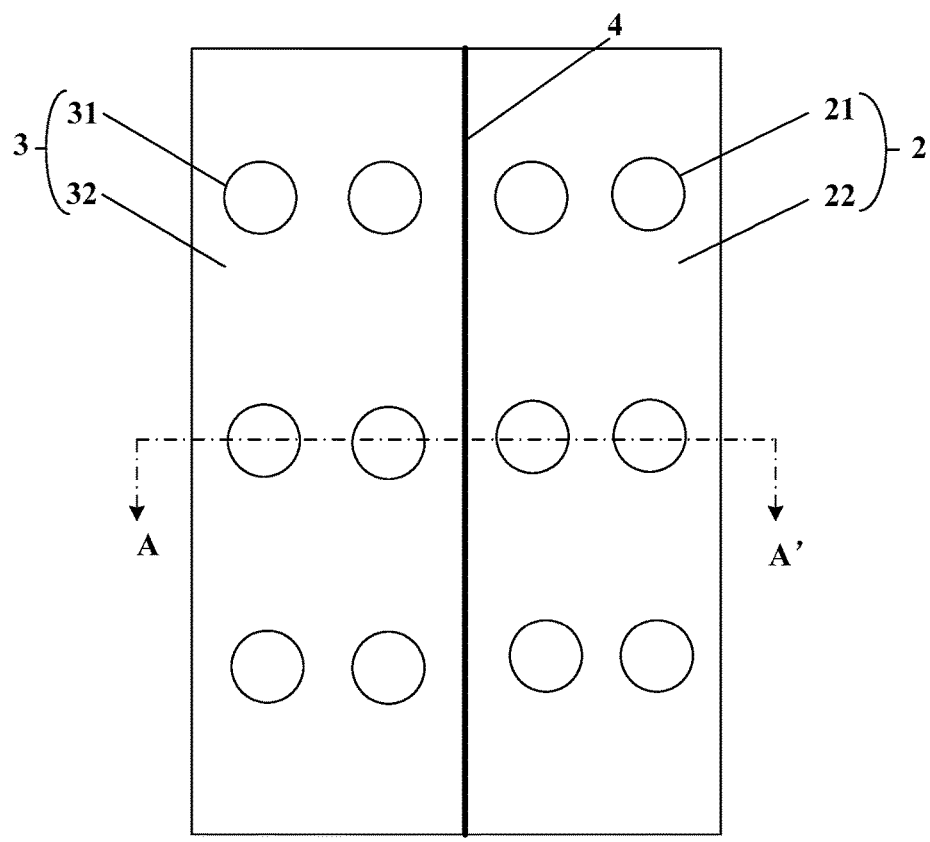
FIG. 6 is a cross-sectional view taken along line B-B' in FIG. 5.

FIGS. 5 and 6 are schematic diagrams of another embodiment of the light source of the present disclosure. FIG. 6 is a cross section taken along line B-B' in FIG. 5, and FIG. 5 is a cross section taken along line A-A' in FIG. 6. As shown in FIG. 5, the light emitting portion 10 has a linear shape, for example, a straight linear shape. In this embodiment, the first light emitting component 2, the second light emitting component 3, the separation component 4, and the light emitting component 5 are also linear. As shown in FIG. 5, the first light emitting component 2 and the second light emitting component 3 are located on opposite sides of the separation component 4 such that the first light emitting component 2 emits light toward one side of the light emitting portion 10, and the second light emitting component 3 emits light toward other side of the light emitting portion 10.

According to this embodiment, two independent light emitting regions can be formed on opposite sides of the light emitting portion 10. The first light emitting component 2 provides light in one of these regions and the second light emitting component 3 provides light in the other region without affecting each other. When only one of the first light emitting component 2 and the second light emitting component 3 is required to emit light, the other can be turned off to reduce power consumption. When the first light emitting component 2 and the second light emitting component 3 are required to emit light simultaneously, the first light emitting component 2 and the second light emitting component 3 can operate simultaneously.

Other embodiments of the present disclosure will readily occur to those skilled in the art upon consideration of the specification and practice of the present disclosure as disclosed herein. This application is intended to cover any variations, uses, or adaptations of the disclosure that follow the general principles of the disclosure and include what is generally known in the art, which is not disclosed in this disclosure, or is dependent on conventional techniques. The specification and the embodiments are to be considered exemplary only, with the true scope and spirit of the invention being disclosed by the following claims.

What is claimed is:

1. A light source of a backlight module, comprising a substrate and a light emitting portion disposed on the substrate;
    the light emitting portion comprises:
    a first light emitting component disposed on the substrate;
    a second light emitting component disposed on the substrate and capable of emitting light independently of the first light emitting component; and
    a separation component located between the first light emitting component and the second light emitting component, the separation component being a light reflective structure, such that the first light emitting component and the second light emitting component emit light toward directions away from the light reflective structure respectively,
    wherein the light emitting portion has an annular shape, and the first light emitting component, the second light emitting component, and the separation component all have annular shapes, and wherein the separation component surrounds the second light emitting component, and the first light emitting component surrounds the separation component such that the first light emitting component emits light toward an outer side of the annular shape thereof, and the second light emitting component emits light toward an inner side of the annular shape thereof.

2. The light source according to claim 1, wherein the first light emitting component comprises:
    a plurality of first light emitting units disposed on the substrate;
    the second light emitting component comprises:
    a plurality of second light emitting units disposed on the substrate.

3. The light source according to claim 2, wherein the first light emitting component further comprises:
    a first scattering layer covering each of the plurality of first light emitting units;
    the second light emitting component further comprises:
    a second scattering layer covering each of the plurality of second light emitting units.

4. The light source according to claim 1, wherein the light source further comprises:
    a reflective component matched to the shape of the light emitting portion and covering the light emitting portion from a side opposite to the substrate.

5. A backlight module, comprising:
    a light guide plate having a backlight side and a light exiting side;
    a light source comprising a substrate and a light emitting portion disposed on the substrate;
    the light emitting portion comprises:
    a first light emitting component disposed on the substrate;
    a second light emitting component disposed on the substrate and capable of emitting light independently of the first light emitting component; and
    a separation component located between the first light emitting component and the second light emitting component, the separation component being a light reflective structure, such that the first light emitting component and the second light emitting component emit light toward directions away from the light reflective structure respectively,
    wherein the light emitting portion of the light source extends into the light guide plate from the backlight side to separate the light guide plate into a first light emitting region and a second light emitting region, the first light emitting component being configured to emit light to the first light emitting region, and the second light emitting component being configured to emit light to the second light emitting region, wherein the light emitting portion has an annular shape, and the first light emitting component, the second light emitting component, and the separation component all have annular shapes, and wherein the separation component surrounds the second light emitting component, and the first light emitting component surrounds the separation component such that the first light emitting component emits light toward an outer side of the annular shape thereof, and the second light emitting component emits light toward an inner side of the annular shape thereof.

6. The backlight module according to claim 5, wherein the backlight side is provided with a receiving groove recessed toward the light exiting side, the light emitting portion extending into the receiving groove.

7. The backlight module according to claim 5, wherein the light guide plate includes a first plate body and a second plate body that are independent of each other, wherein a receiving gap is formed between the first plate body and the second plate body, the light emitting portion extending into the receiving gap.

8. A display device, comprising a backlight module, the backlight module comprises:
a light guide plate having a backlight side and a light exiting side; and
a light source comprising a substrate and a light emitting portion disposed on the substrate;

the light emitting portion comprises:
a first light emitting component disposed on the substrate;
a second light emitting component disposed on the substrate and capable of emitting light independently of the first light emitting component; and
a separation component located between the first light emitting component and the second light emitting component, the separation component being a light reflective structure, such that the first light emitting component and the second light emitting component emit light toward directions away from the light reflective structure respectively, wherein the light emitting portion of the light source extends into the light guide plate from the backlight side to separate the light guide plate into a first light emitting region and a second light emitting region, the first light emitting component being configured to emit light to the first light emitting region, and the second light emitting component being configured to emit light to the second light emitting region, wherein the light emitting portion has an annular shape, and the first light emitting component, the second light emitting component, and the separation component all have annular shapes, and wherein the separation component surrounds the second light emitting component, and the first light emitting component surrounds the separation component such that the first light emitting component emits light toward an outer side of the annular shape thereof, and the second light emitting component emits light toward an inner side of the annular shape thereof.

* * * * *

UNITED STATES PATENT AND TRADEMARK OFFICE
CERTIFICATE OF CORRECTION

PATENT NO. : 10,935,844 B2
APPLICATION NO. : 16/618586
DATED : March 2, 2021
INVENTOR(S) : Xiaoli Xia Page 1 of 1

It is certified that error appears in the above-identified patent and that said Letters Patent is hereby corrected as shown below:

On the Title Page

Item (73), Column 1, Assignees, Line 2, Delete "Technoloev" and insert -- Technology --

In the Specification

Column 1, Line 13, after "in" delete "its"

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*